United States Patent
Reynolds et al.

[11] Patent Number: 6,062,271
[45] Date of Patent: May 16, 2000

[54] POLYMETHYLPENTENE CABLE LINER

[75] Inventors: Kim A. Reynolds, Berwyn; Charles P. Marino, Philadelphia, both of Pa.

[73] Assignee: Markel Corporation, Norristown, Pa.

[21] Appl. No.: 09/083,867

[22] Filed: May 22, 1998

[51] Int. Cl.$^7$ .................................................. F16L 11/00
[52] U.S. Cl. ............................. 138/137; 138/140; 138/98
[58] Field of Search ........................... 138/98, 137, 140; 524/491, 477, 240; 174/36

[56] References Cited

U.S. PATENT DOCUMENTS

| | | | |
|---|---|---|---|
| 4,146,487 | 3/1979 | Rumierz | 252/12 |
| 4,328,146 | 5/1982 | Andy | 523/216 |
| 4,440,974 | 4/1984 | Naudet | 174/108 |
| 4,546,150 | 10/1985 | Shigemoto | 525/240 |
| 4,777,201 | 10/1988 | Shigemoto et al. | 524/269 |
| 4,880,589 | 11/1989 | Shigemoto et al. | 264/216 |
| 5,080,979 | 1/1992 | Shigemoto et al. | 428/520 |
| 5,104,920 | 4/1992 | Keogh | 524/264 |
| 5,296,527 | 3/1994 | Boudreaux, Jr. | 524/502 |
| 5,306,869 | 4/1994 | Springer et al. | 174/36 |
| 5,338,792 | 8/1994 | Nagase et al. | 524/477 |
| 5,349,007 | 9/1994 | Serizawa et al. | 524/513 |
| 5,382,620 | 1/1995 | Nagase et al. | 524/491 |
| 5,480,718 | 1/1996 | Shigemoto et al. | 428/342 |
| 5,492,767 | 2/1996 | Yazaki et al. | 428/500 |
| 5,534,593 | 7/1996 | Friedman | 525/240 |
| 5,575,952 | 11/1996 | Keogh et al. | 252/404 |
| 5,583,177 | 12/1996 | Kinoshita et al. | 524/600 |
| 5,693,418 | 12/1997 | Shigemoto et al. | 428/342 |
| 5,807,635 | 9/1998 | Cogen et al. | 428/379 |
| 5,814,768 | 9/1998 | Wessels et al. | 174/110 FC |

OTHER PUBLICATIONS

Mitsui Petrochemical, Polymethylpentene "TPX".
Markel Corporation, AR–200 Product Data Sheet, Mar. 1998.

*Primary Examiner*—Patrick Brinson
*Attorney, Agent, or Firm*—Synnestvedt & Lechner LLP

[57] ABSTRACT

An abrasion resistant tubular article comprising poly(4-methyl-1-pentene) having high frictional efficiency over wide temperature and load conditions. The article of the present invention is particularly well adapted for use in motion transmitting cable assemblies and the like.

14 Claims, No Drawings

POLYMETHYLPENTENE CABLE LINER

FILED OF THE INVENTION

This invention relates to lightweight tubular articles comprising poly(4-methyl-1-pentene) having high internal frictional efficiency and abrasion resistance over wide temperature and load conditions. The articles of the present invention are particularly well adapted for use as cable liners in motion transmitting cable assemblies and the like.

BACKGROUND OF THE INVENTION

Motion transmitting cable assemblies are typically used for the transmission of force and/or motion from one location to another in apparatus such as automobiles, aircraft, marine craft, motorcycles and bicycles. Such cable assemblies, typically comprising a cable for transmitting the appropriate force or motion and a conduit through which the cable is guided, are used in connection with the various critical components of the aforementioned apparatus, such as throttles, clutches and brakes, as well as a variety of accessories such as air conditioners, heaters, vents, side view mirrors, and the like. It will be understood that as used herein, motion transmitting cable assemblies shall mean extruded and molded tubular products such as push-pull, push-push, pull-pull and rotary cable assemblies and the like, as well as combinations and variations thereof.

Motion transmitting cable assemblies involve a variety of movements of the cable relative to the surrounding conduit including unidirectional, reciprocal, rotary, and combinations of these. Moreover, the movements of the cable relative to the surrounding conduit may range widely in rate, degree and constancy as well as the load under which such movements occur. As a result of these movements, the internal surface of the conduit surrounding the cable is subjected to repeated contact and abrasion by the cable. As used herein, abrasion will refer to the types of damage resulting to the internal surfaces of the articles of the present invention due to the relative movement of cables running therethrough.

It will be appreciated that reliable operation of motion transmitting cable assemblies over extended periods of use is both desirable and critical to the safety of vehicles employing such assemblies. Consequently, in order to achieve superior or even acceptable cable assembly life, conduits have heretofore been constructed with abrasion resistant liners, have employed lubricants and protective outer wrappings or casings, and have utilized combinations of these measures.

Polyethylene is well known in the art and has heretofore been utilized in extruded and molded products such as motion transmitting cable assemblies and the like. The use of polyethylene, however, is limited in applications in which frictional efficiency is required at elevated temperatures. Motion transmitting cable assemblies having uncrosslinked polyethylene liners exhibit frictional efficiency up to about 85° C. By utilizing crosslinked polyethylene, the temperature at which frictional efficiency is maintained can be extended up to about 105° C. As a result, for applications such as motion transmitting cable assemblies and the like in which frictional efficiency is required above 105° C., polyethylene, even in crosslinked form, cannot be used effectively.

Fluorocarbon polymers, such as polytetrafluoroethylene (PTFE), are also well known in the art and have also heretofore been utilized in extruded and molded products such as motion transmitting cable assemblies and the like. In their pure form, PTFE resins exhibit excellent frictional efficiencies over a wide temperature range, well above that of polyethylene. In such form, however, PTFE resins generally exhibit unacceptably low abrasion resistance. As a result, attempts have been made to improve the abrasion resistance of PTFE resins used in products such as motion transmitting cable assemblies and the like by the addition of organic and inorganic materials as fillers. The inclusion of such fillers, however, can adversely affect the frictional efficiency of the product formed therefrom. Moreover, PTFE is a relatively expensive material, and the use of fillers imposes additional manufacturing steps and adds to the overall labor and materials costs of the articles so produced.

Due to these and other limitations found in the prior art, the advantageous combination of high frictional efficiency over a wide temperature range and superior abrasion resistance in motion transmitting cable assemblies has heretofore been limited. Applicant has surprisingly and unexpectedly found that the use of poly(4-methyl-1-pentene) in the construction of cable liners yields a lightweight article which exhibits both high frictional efficiency over a wide temperature range and superior resistance to abrasion as well as heat and chemical attack. The articles of the present invention are particularly well adapted for use in motion transmitting cable assemblies and the like.

Accordingly, it is an object of the present invention to provide an abrasion resistant conduit comprising poly(4-methyl-1-pentene).

It is another object of the present invention to provide an abrasion resistant conduit comprising poly(4-methyl-1-pentene) adapted for use in motion transmitting cable assemblies and the like.

It is yet another object of the present invention to provide an abrasion resistant conduit comprising poly(4-methyl-1-pentene) adapted for use in motion transmitting cable assemblies and the like having high frictional efficiency over a wide range of temperature and load conditions as well as superior abrasion, heat and chemical resistance.

Still other objects of the invention will be apparent to those skilled in the art and upon consideration of the following description of the invention.

DETAILED DESCRIPTION OF THE INVENTION

The present invention relates to abrasion resistant articles comprising poly(4-methyl-1-pentene) having high internal frictional efficiency as well as enhanced resistance to heat and chemical attack. As disclosed more fully below the articles of the present invention are well adapted for use as a cable liner in motion transmitting assemblies and the like as the performance characteristics permit such use over the wide range of temperature and load conditions found in such applications.

A distinguishing feature of the articles of the present invention over the prior art is the use of poly(4-methyl-1-pentene). It will be understood that as used herein, poly(4-methyl-1-pentene) denotes a homopolymer of 4-methyl-1-pentene or a copolymer of 4-methyl-1-pentene and another alpha-olefin. The alpha-olefin may, for example, be an alpha-olefin having 2 to 20 carbon atoms (excepting 4-methyl-1-pentene) such as ethylene, propylene, 1-butene, 1-hexene, 1-octene, 1-decene, 1-tetradecene and 1-octadecene. Preferably, the copolymer of 4-methyl-1-pentene and another alpha-olefin monomer comprises at least 85 mole % of 4-methyl-1-pentene.

In certain preferred embodiments, the articles of the present invention consist essentially of poly(4-methyl-1- pentene). In other preferred embodiments, however, where applications require even higher frictional efficiencies, the articles of the present invention comprise a major proportion of poly(4-methyl-1-pentene) and a minor proportion of PTFE. In such embodiments, the articles of the present invention preferably comprise from about 95 to about 99 wt. % poly(4-methyl-1-pentene) and from about 1 to about 5 wt. % PTFE.

In certain preferred embodiments, the articles of the present invention comprise a mixture of poly(4-methyl-1-pentene) and other materials such as organic fillers, inorganic fillers, colorants and the like. The selection of other materials to be combined with poly(4-methyl-1-pentene) will depend upon, among other things, the requirements of the particular applications to which the end product will be put.

The organic fillers suitable for use in the articles of the present invention may be any of a wide variety of high temperature organic compounds including, for example, aromatic polyesters, thermoplastic or thermosetting polyamide, polyimide, and polyamide imide resins, polyetherimides, polyether ketones, polyether ether ketones, polysufones, polyether sulfones, polyphenylene sulfones, polyphenylene sulfides, polysulfide imides, and the like.

The inorganic fillers suitable for use in the present invention may comprise a wide variety of inorganic materials including, for example, mica, carbon fibers, carbon powder, graphite, coke flour, amorphous glass, glass fibers, glass spheres, milled glass, bronze, iron powder, iron oxide, silicon carbide, silicon dioxide, boric oxide, zirconium oxide, and molybdenum disulfide and the like.

The colorants suitable for use in the present invention may comprise a wide variety of pigments, dyes and colorants which are capable of being heated to temperatures above the melting point of poly(4-methyl-1-pentene) without significant degradation. An example of a preferred colorant is a poly(4-methyl-1-pentene)-based color concentrate, designated as Nippisui Color Concentrate manufactured by Nippon Pigment Company, Ltd. of Tokyo, Japan.

In certain preferred embodiments, a melt extrusion process is employed. When such a process is applied to the present invention, it preferably comprises the steps of 1) placing poly(4-methyl-1-pentene) in a melt extruder; 2) heating the poly(4-methyl-1-pentene) to a temperature above its melting point; 3) melt extruding the poly(4-methyl-1-pentene) under pressure through a die on a mandrel; and 4) cooling the extruded article. Preferably, the heating step will raise the temperature of the poly(4-methyl-1-pentene) to about 470° F., and the extrusion step will occur at a pressure of about 240 to about 260 psi. While the cooling step may be accomplished in a number of ways known to the art, it is preferred to use an ambient temperature water bath. Excess water may be removed after cooling by means of an air wipe prior to spooling. While the method of making the articles of the present invention may be adapted to both batch and continuous processes, it is preferred that it be performed as a continuous process.

In employing a melt extrusion process, it is preferred to use poly(4-methyl-1-pentene) in pelletized form for ease of handling. Particularly preferred grades of poly(4-methyl-1-pentene) are those sold under the trademark TPX® by Mitsui Petrochemicals, Inc. of Tokyo, Japan. In those embodiments in which fillers are used, the additional step of mixing the selected filler with the poly(4-methyl-1-pentene) precedes the extrusion step. Depending on the type of filler and extrusion process used, the mixing step may occur prior to, during or after the melting step.

While the inner diameter and thickness of the articles of the present invention will be determined by, and will vary in accordance with, among other things, the applications for which such articles are intended, it is contemplated that in those applications in which the articles of the present invention are used as cable liners in motion transmitting cable assemblies, it is preferred that the inner diameter be about 50 to about 250 mils, and the wall thickness be about 10 to about 60 mils, more preferably about 10 to about 25 mils, and even more preferably about 10 to about 15 mils.

The articles of the present invention are particularly well adapted for use as cable liners for motion transmitting cable assemblies as they exhibit an advantageous combination of frictional efficiency and abrasion resistance. In addition, the articles of the present invention are relatively lightweight compared with prior art cable liners, relatively inexpensive to manufacture, and are resistant to heat and chemical attack. Depending upon the specific application to which they are put, the articles of the present invention may be jacketed with thermoplastic materials such as, for example, nylon 6,6, polypropylene, or polybutylene terephthalate, or wrapped with a stainless steel ribbon prior to use in motion transmitting cable assemblies.

EXAMPLE 1

50 lbs. of poly(4-methyl-1-pentene) in pellet form, sold under the trade name TPX® grade MX-002, manufactured by Mitsui Petrochemicals, Inc. of Tokyo, Japan, are placed into the hopper of a Model #25VT Davis Standard 2.5" diameter melt extruder having a barrier screw with a mixing head. The pellets are advanced into the feed section of the extruder and heated to 470° F. to form a melt. Using a draw down ratio of 2:1, the molten poly(4-methyl-1-pentene) is extruded through a circular 0.170" die on a 0.139" mandrel at a rate of 150 feet per minute. The extruded tubing is then cooled in a water bath maintained at ambient temperature. Excess water is removed by means of an air wipe, and the cooled tubing is then spooled.

EXAMPLE 2

In order to demonstrate the advantageous combination of frictional efficiency and abrasion resistance of the articles of the present invention compared with prior art cable liners, a high-load, ambient temperature S-test was performed on three samples of the extruded article produced in accordance with the method of Example 1, designated as test samples A, B, and C, and one sample of a prior art PTFE cable liner sold under the trade name AR-500 by Markel Corporation, Norristown, Pa., designated as test sample D.

This test was conducted on all of the samples using a 7×7 stranded stainless steel wire guided therethrough routed over an "S" shaped fixture wherein the curvilinear portions define inner radii of 4 inches and subtend angles of 120 degrees in accordance with General Motors standard CMP-TF004. A motor driven cam was attached at one end of the wire and a variable load spring was attached at the other end having a load of 6 lbs. at full compression and 18 lbs. at full extension. The wire was then actuated by a motor to cause a repetitive reciprocal movement of 1.5 inches relative to the tubular conduit at a frequency of 60 cycles per minute.

Abrasion resistance of the samples were calculated by measuring the loss of material comprising the samples due to wear. Frictional efficiency was measured in accordance with General Motors standard CMP-TF004 in which each sample was disconnected from the spring and a five pound weight was attached to the wire at that end of the sample. A calibrated load cell was then placed between the cam and the other end of the sample, and the force required to lift the weight was measured. The efficiency was then calculated as the force exerted by the weight divided by the actual force required to lift the weight multiplied by 100 and expressed as a percentage. The abrasion resistance and frictional efficiency of the samples are shown in Table 1 set forth below:

TABLE 1

|  | A | B | C | D |
|---|---|---|---|---|
| Inside Diameter (inches) | 0.095 | 0.095 | 0.095 | 0.098 |
| Outside Diameter (inches) | 0.124 | 0.124 | 0.124 | 0.120 |
| Initial Weight (grams) | 2.7029 | 2.7172 | 2.7153 | 4.6871 |
| Final Weight (grams) | 2.6945 | 2.7008 | 2.6981 | 4.6663 |
| Weight Change | −0.0084 | −0.0164 | −0.0172 | −0.0112 |
| Initial Efficiency | 79% | 79% | 73% | 86% |
| Efficiency (151,385 cycles) | 77% | 79% | 78% | 87% |
| Efficiency (256,496 cycles) | 82% | 77% | 75% | 89% |
| Efficiency (354,637 cycles) | 81% | 75% | 77% | 89% |
| Efficiency (486,028 cycles) | 77% | 70% | 77% | 86% |
| Efficiency (750,423 cycles) | 72% | 62% | 77% | 86% |
| Efficiency (850,019 cycles) | 68% | 60% | 74% | 86% |
| Efficiency (951,742 cycles) | 68% | 58% | 73% | 86% |
| Efficiency (1,020,486 cycles) | 67% | 57% | 72% | 86% |

From this data, it is readily apparent that the articles of the present invention exhibit abrasion resistance and frictional efficiency comparable to heavier and more expensive cable liners comprising PTFE.

EXAMPLE 3

In order to demonstrate the advantageous combination of frictional efficiency and abrasion resistance of the articles of the present invention compared with prior art cable liners at elevated temperatures, a high-load, ambient temperature S-test was performed on two samples of the extruded article produced in accordance with the method of Example 1, designated as test samples A and B, two samples of a prior art crosslinked polyethylene cable liner sold under the trade name AR-150 by Markel Corporation, Norristown, Pa., designated as test samples C and D, and two samples of a prior art PTFE cable liner sold under the trade name AR-500 by Markel Corporation, Norristown, Pa., designated as test samples E and F. The test was performed in all respects the same as described in Example 2 above except that the temperature at which the test was conducted was 120° C. The abrasion resistance and frictional efficiency of the samples are shown in Table 2 set forth below:

TABLE 2

|  | A | B | C | D | E | F |
|---|---|---|---|---|---|---|
| Inside Diam. (inches) | 0.095 | 0.095 | 0.101 | 0.101 | 0.097 | 0.097 |
| Outside Diam. (inches) | 0.124 | 0.124 | 0.129 | 0.129 | 0.123 | 0.123 |
| Init. Weight (grams) | 2.7024 | 2.7022 | 3.0439 | 3.0448 | 4.8025 | 4.8919 |
| Final Weight (grams) | 2.7204 | 2.7292 | 3.0306 | 3.0719 | 4.8204 | 4.9058 |
| Weight Change | +0.018 | +0.027 | −0.023 | −0.027 | +0.018 | +0.014 |
| Initial Efficiency | 74% | 73% | 80% | 81% | 86% | 85% |

TABLE 2-continued

|  | A | B | C | D | E | F |
|---|---|---|---|---|---|---|
| Efficiency (93,053 cycles) | 73% | 71% | Failed at 553 cycles | Failed at 841 cycles | 88% | 87% |
| Efficiency (183,888 cycles) | 71% | 77% | X | X | 89% | 90% |
| Efficiency (281,293 cycles) | 71% | 75% | X | X | 88% | 88% |
| Efficiency (364,519 cycles) | 69% | 70% | X | X | 90% | 89% |
| Efficiency (441,086 cycles) | 67% | 62% | X | X | 87% | 88% |
| Efficiency (516,773 cycles) | 68% | 60% | X | X | 89% | 88% |

From this data, it is readily apparent that the articles of the present invention exhibit abrasion resistance and frictional efficiency comparable to heavier and more expensive cable liners comprising PTFE under elevated temperature conditions at which cable liners comprising crosslinked polyethylene fail rapidly.

What is claimed is:

1. A tubular article having an abrasion resistant inner surface comprising about 95 to about 99 wt. % poly(4-methyl-1-pentene) and about 1 to about 5 wt. % polytetrafluoroethylene.

2. The article of claim 1 further comprising a colorant.

3. The article of claim 1 further comprising a filler.

4. The article of claim 3 wherein the filler is organic.

5. The article of claim 4 wherein the filler is selected from the group consisting of aromatic polyesters, thermoplastic or thermosetting polyamide, polyimide, and polyamide imide resins, polyetherimides, polyether ketones, polyether ether ketones, polysufones, polyether sulfones, polyphenylene sulfones, polyphenylene sulfides, polysulfide imides and combinations of two or more of these.

6. The article of claim 3 wherein the filler is inorganic.

7. The article of claim 6 wherein the filler is selected from the group consisting of mica, carbon fibers, carbon powder, graphite, coke flour, amorphous glass, glass fibers, glass spheres, milled glass, bronze, iron powder, iron oxide, silicon carbide, silicon dioxide, boric oxide, zirconium oxide, and molybdenum disulfide and combinations of two or more of these.

8. The article of claim 1 having an inner diameter of about 50 to about 250 mils, and a wall thickness of about 10 to about 60 mils.

9. The article of claim 8 wherein the wall thickness is about 10 to about 25 mils.

10. The article of claim 8 wherein the wall thickness is about 10 to about 15 mils.

11. A motion transmitting cable assembly comprising the tubular article of claim 1.

12. The article of claim 11 having an inner diameter of about 50 to about 250 mils, and a wall thickness of about 10 to about 60 mils.

13. The article of claim 12 wherein the wall thickness is about 10 to about 25 mils.

14. The article of claim 12 wherein the wall thickness is about 10 to about 15 mils.

* * * * *